US008583743B1

(12) United States Patent
Gailloux et al.

(10) Patent No.: US 8,583,743 B1
(45) Date of Patent: *Nov. 12, 2013

(54) SYSTEM AND METHOD FOR MESSAGE GATEWAY CONSOLIDATION (75) Inventors: Michael A. Gailloux, Overland Park, KS (US); Michael W. Kanemoto, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 341 days.

This patent is subject to a terminal disclaimer.

(21) Appl. No.: 11/868,592

(22) Filed: Oct. 8, 2007

(51) Int. Cl.
*G06F 15/16* (2006.01)

(52) U.S. Cl.
USPC ........... 709/206; 709/203; 709/205; 709/219; 707/756; 707/760

(58) Field of Classification Search
USPC .................................................. 709/204–207
See application file for complete search history.

(56) References Cited

U.S. PATENT DOCUMENTS

| | | | |
|---|---|---|---|
| 6,330,589 B1 | 12/2001 | Kennedy | |
| 7,194,516 B2 | 3/2007 | Giacobbe et al. | |
| 2002/0087704 A1 | 7/2002 | Chesnais et al. | |
| 2002/0156871 A1* | 10/2002 | Munarriz et al. | 709/219 |
| 2002/0165912 A1* | 11/2002 | Wenocur et al. | 709/203 |
| 2002/0183080 A1* | 12/2002 | Poor et al. | 455/466 |
| 2005/0044144 A1* | 2/2005 | Malik et al. | 709/205 |
| 2005/0138002 A1* | 6/2005 | Giacobbe et al. | 707/3 |
| 2006/0007466 A1* | 1/2006 | Ben-Yehuda et al. | 358/1.13 |
| 2006/0041684 A1* | 2/2006 | Daniell et al. | 709/246 |
| 2006/0075040 A1 | 4/2006 | Chmaytelli | |
| 2006/0271630 A1 | 11/2006 | Bensky et al. | |
| 2007/0010265 A1 | 1/2007 | Henderson et al. | |
| 2007/0143428 A1 | 6/2007 | Kumar et al. | |
| 2008/0059587 A1 | 3/2008 | Burtner et al. | |
| 2008/0215694 A1 | 9/2008 | Chen et al. | |

OTHER PUBLICATIONS

Gailloux, Michael A., et al., Patent Application entitled, "System and Method for Message Presentation Consolidation," filed Oct. 8, 2007, U.S. Appl. No. 11/868,590.
Office Action dated Nov. 10, 2009, 19 pages, U.S. Appl. No. 11/868,590, filed Oct. 8, 2007.
Advisory Action dated Aug. 12, 2010, 3 pages, U.S. Appl. No. 11/868,590, filed Oct. 8, 2007.
Final Office Action dated May 27, 2010, 18 pages, U.S. Appl. No. 11/868,590, filed Oct. 8, 2007.
Chen, Chung-Min, et al., "System and Method for a Unified Multimedia Messaging Service Platform," U.S. Appl. No. 60/901,964, filed Feb. 6, 2007, 11 pages.
Final Office Action dated Apr. 25, 2011, U.S. Appl. No. 11/868,590, filed Oct. 8, 2007.
Office Action dated Nov. 24, 2010, U.S. Appl. No. 11/868,590, filed Oct. 8, 2007.

\* cited by examiner

*Primary Examiner* — Ian N Moore
*Assistant Examiner* — Jackie Zuniga (57) ABSTRACT

A method for consolidating platform-specific messages is disclosed. The method comprises translating a first message in one of a plurality of platform-specific message formats into a second message in a generic message format and translating a third message in the generic message format to a fourth message in one of the plurality of platform-specific message formats. The method also comprises associating a plurality of messages that have been translated from the platform-specific message formats into the generic message format into at least one thread based on at least one of a plurality of threading fields for presentation. The method also comprises inserting at least one of the first, second, third, and fourth messages into a message database and managing the message database.

19 Claims, 3 Drawing Sheets

SYSTEM AND METHOD FOR MESSAGE GATEWAY CONSOLIDATION

CROSS-REFERENCE TO RELATED APPLICATIONS

This application includes subject matter related to U.S. patent application Ser. No. 11/868,590, filed Oct. 8, 2007, entitled "System and Method for Message Presentation Consolidation," by Michael W. Kanemoto, et al, which is incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

There are a variety of messaging technologies or platforms that allow users to communicate by sending messages among themselves. The message platforms may include email, voice mail, instant messaging (IM), short message service (SMS), Internet relay chat (IRC), and really simple syndication (RSS), among other current and future message platforms. Messaging may be one-to-one such as IM, where one user may send a message to only one recipient at a time. Messaging may be one-to-many such as email, where one user may send a message to many recipients at a time. The messaging may be unidirectional or bidirectional. A bidirectional messaging system may allow a recipient to reply to a received message such as in email. A unidirectional messaging system may only allow a recipient to view, but not respond to, a received message, such as a news feed from an RSS system. A message platform may include at least one transport network that transfers messages from one network node to another, at least one network server, also referred to as a message gateway (GW) that is dedicated to the messaging service, and one or more messaging protocols. For example, the email message platform may comprise Internet protocol (IP) networks as the transport network, one or more email gateways, and the messaging protocol simple mail transfer protocol (SMTP).

A client device in a message system is used by either a sender to send a message or a recipient to receive and view the message. The client device may be a desk phone, a computer, a personal digital assistant (PDA), or a mobile phone. Wireless devices are becoming a common choice of the client device for messaging. A wireless client device may support one or more message platforms, depending on the hardware and software the wireless client device may support. The more message platforms the wireless client device may support, the more computing resources and sophisticated software the client device may have to have.

SUMMARY

In an embodiment, a method for consolidating platform-specific messages is disclosed. The method comprises translating a first message in one of a plurality of platform-specific message formats into a second message in a generic message format and translating a third message in the generic message format to a fourth message in one of the plurality of platform-specific message formats. The method also comprises associating a plurality of messages that have been translated from the platform-specific message formats into the generic message format into at least one thread based on at least one of a plurality of threading fields for presentation. The method also comprises inserting at least one of the first, second, third, and fourth messages into a message database and managing the message database.

In another embodiment, a method for consolidating messages of different message platforms is provided that comprises receiving a first message in one of a plurality of platform-specific message formats, creating a new message header from a message header of the first message, translating a message body of the first message into a new message body, and creating a second message in a generic message format from the new message header and the new message body.

In a further embodiment, a system for consolidating platform-specific messages is provided that comprises a message format translator configured to translate a first message in one of a plurality of platform-specific message formats into a second message in a generic message format, and to translate a third message in the generic message format to a fourth message in one of the plurality of platform-specific message formats. The system also includes a message presentation formatter configured to thread a plurality of messages that have been translated from the plurality of platform-specific message formats into the generic message format into at least one thread based on at least one of a plurality of threading fields for presentation, and a message database configured to insert, search for, modify, and delete the first message, the second message, the third message, and the fourth message.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A message platform supports a messaging system and related application. Each message platform may be unique, and the messaging protocol associated with a message platform may be referred to as platform-specific messaging protocol. A user may have a separate session with a separate user interface (UI) for each message platform. For example, the user may start an email session with an email UI to read/send emails. The user then may start a separate session with a different UI for an IM chat with a friend. As wireless client devices become a more common choice for a consolidated communication device, it may be either impractical or inefficient for a wireless client device to be configured with the software and computing resources to support multiple message platforms.

The present disclosure provides a consolidated messaging solution that may combine multiple platform-specific UIs into a single, generic UI and allow a client device to present different types of messages using one generic message format. The consolidated messaging solution may combine multiple platform-specific message gateways into a generic message gateway. The consolidated messaging solution may include a message format translator. For an inbound message, the format translator may translate a platform-specific message format into a generic message format. For an outbound message, the format translator may either convert a generic message format to a platform-specific message format or retain the generic message format, depending on the capability of the receiving client device and the preference of the recipient. A message database may be used to store messages for later processing. A message presentation formatter may thread messages in the generic message format into at least one message thread based on a threading field contained in or otherwise associated with the messages. The threading field may be based on a subject, a time-date stamp, a message sender identity, a message receiver identity, a keyword, a location, an ad-hoc group designation, a message importance level, or other. A message thread is a group of messages that are connected together or associated together by a common value of one or more threading fields. The messages may be grouped into a message thread to help the user locate related messages and contents. Viewing a message as part of a message thread may promote viewing the message in a context which may promote more rapid and rich understanding of the message contents. Message threads may be sent from a first device to a second device, for example from a first mobile phone to a second mobile phone, or from a personal digital assistant to a desktop computer. Message threads are assembled or composed by selecting messages stored in a database according to a constraint or constraints based on one or more values for threading fields. This mechanism allows threads to be constructed dynamically by users to promote viewing messages composed using different messaging platforms associated by thread field values rather than according to messaging platform.

Figure 1:
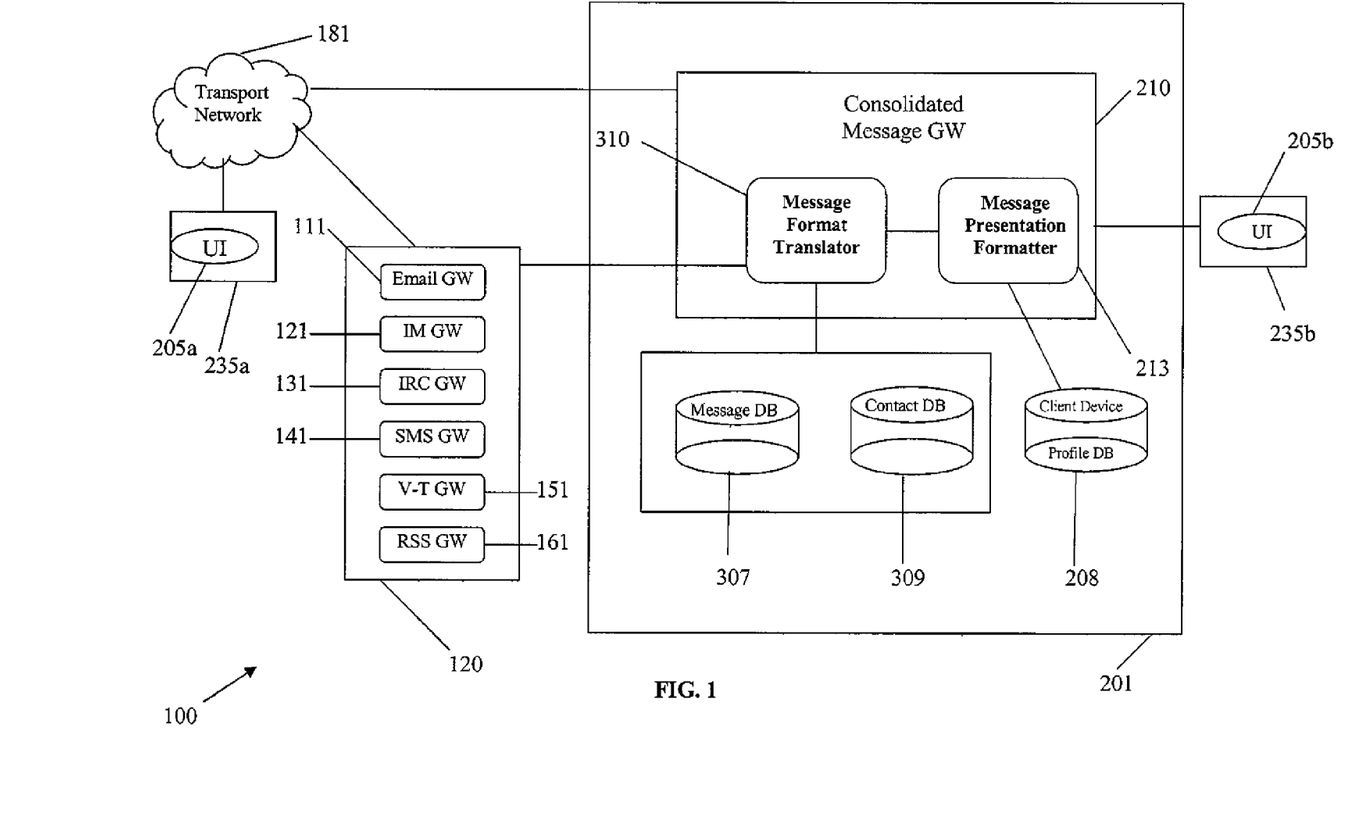
FIG. 1 illustrates an embodiment of a consolidated message network.

FIG. 1 illustrates an embodiment of a combination 100 of a consolidated message network 201 coupled with a server cluster 120 comprising a set of platform-specific message gateways 111, 121, 131, 141, 151, and 161, a transport network 181, and client devices 235 with UIs 205. The consolidated message network 201 comprises a consolidated message gateway 210 and a set of databases including a message database 307, a contact database 309, and a client device profile database 208. The consolidated message gateway 210 in turn comprises a message format translator 310 and a presentation formatter 213, and is coupled with a generic UI 205*b* on the client device 235*b*. According to at least one embodiment, the consolidated message gateway 210 may be accessible by the client device 235*b* via a communication link. The combination 100 shows a practical way to integrate the consolidated message network 201′ into an existing, platform-specific message network. Alternatively, the consolidated messaging network 201 may be directly connected to the transport network 181, if there is not a need to integrate the consolidated message network 201 with an existing legacy message network. With the consolidated message network 201, the single generic UI 205*b* may allow for a user to read and send the messages of multiple message platforms.

The server cluster 120 is a networked group of application servers coupled with the transport network 181. The application servers within the server cluster 120 may be connected to each other via an internal network or the transport network 181. One type of the application server is the message gateways 111, 121, 131, 141, 151, and 161. The message gateways 111, 121, 131, 141, 151, and 161 are platform-specific message gateways. The email gateway 111 may receive an email message, store the email in an email message database (DB) 307, and forward it to a client device such as the client device 235*a*. The email gateway 111 may also translate from one format of the email to a different format suitable to a client device such as the client device 235*a*. The IM gateway 121 may receive an inbound or outbound instant message, store the message in a database, and forward the message to a client device such as the client device 235*a*. The IM gateway 121 may also translate from one format of an instant message to a different format suitable to a client device such as the client device 235*a*. An IRC gateway 131 may receive a chat message, store the message in a message database 307, and forward the message to a client device such as the client device 235*a*. The IRC gateway 131 may also translate from one format of a chat message to a different format suitable to a client device such as the client device 235*a*. The SMS gateway 141 is a back office application and/or device that may receive an inbound or outbound short message, store the message in a message database 307, and forward it to a client device such as the client device 235*a* in a wireless or a wireline network. The voice-text (V-T) gateway 151 may receive a voice mail in an audio format and translate it into a text format, or vice versa, based on the need of a client device such as the client device 235*a*. The voice-text gateway 151 may store the message in a message database 307 and forward the message to a client device such as the client device 235*a*. The RSS gateway 161 may receive a RSS message, store the message in a message database 307, and forward the message to a client device such as the client device 235*a*. The RSS gateway 161 may also translate from one format of a RSS message to a different format suitable to a client device such as the client device 235*a*.

The transport network 181 may transport a message from one network node to another. The transport network 181 may comprise multiple networks based on different networking technologies. The different networking technologies may include Internet protocol (IP), asynchronous transfer mode (ATM), and public switched telephone network (PSTN), among others.

The client devices 235 may be configured to send and receive a message. The client devices 235 may be wireless or wireline devices including a desk phone, a desktop computer, a mobile phone, a wireless personal digital assistant (PDA), a tablet computer, and a laptop computer. The client devices 235 may support one or more message platforms, depending on the hardware and software the client devices 235 may support. The client devices 235 may include a UI 205 for a user to view or send a message. The client device 235*b* including a generic UI 205*b* may be coupled to the consolidated message gateway 210 via an access network (not shown) or another transport network (not shown) similar to the transport network 181.

The UI 205b may be a consolidated user interface independent of a specific message platform. The consolidated UI 205b may promote a user accessing a plurality of platform-specific messages through the single UI 205b within one single session of a messaging client application. For example, the user may view his/her emails, IM messages, IRC messages, SMS messages and voice mails all through the single UI 205b. Without the consolidated UI 205b, the user may need to stop the previous session, and start a new session for a different type of message, using a different set of UI commands. In contrast to the platform-specific UI 205a, which may be an email UI, an SMS UI, an IRC UI, or an IM UI, the consolidated UI 205b may have fields that are a union of the fields of the platform-specific UIs including an email UI, an SMS UI, an IRC UI, and an IM UI. As a result of combining the fields of platform-specific messages, some fields for some messages in the consolidated UI 205b may have a null value. For example, the subject field for an IM message may be null, and the message in the subject field might be formatted and placed in the body of the IM message.

Figure 2:
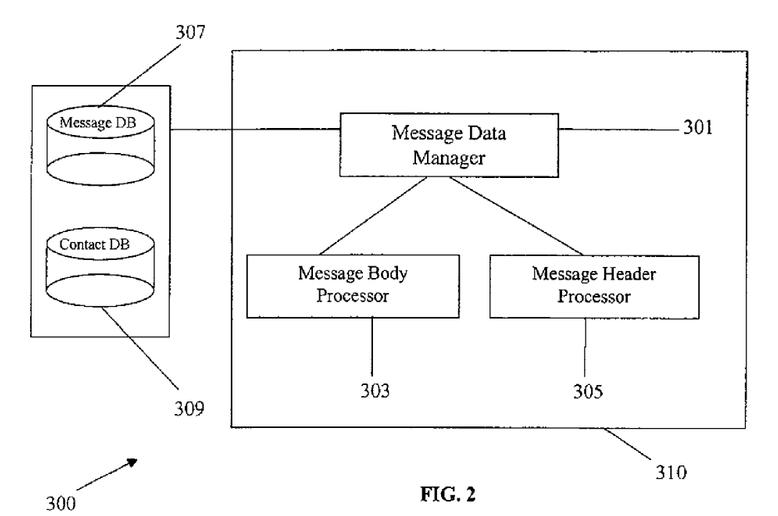
FIG. 2 illustrates an embodiment of a message format translator.

The consolidated message gateway 210 may receive a message in a platform-specific message format from the transport network 181 or from one of the platform-specific message gateways 111, 121, 131, 141, 151, and 161. The consolidated message gateway 210 performs a many-to-one mapping, translating the message in a platform-specific message format into a message in a generic message format. In one embodiment, an extensible markup language (XML)-based generic message format is adopted. For each inbound, platform-specific message, the consolidated message gateway 210 may process the message header and then translate the message body. The consolidated message gateway 210 may then format the translated message for presentation on the client device 235b. The consolidated message gateway 210 may be implemented as a single module or multiple modules, depending on the design choice. The details of the message format translator 310 are illustrated in FIG. 2, and described in more detail later.

The message presentation formatter 213 may format a plurality of inbound messages in the generic message format for presentation at the client device 235b. The message presentation formatter 213 may retrieve a client device profile for the client device from the client device profile database 208. The client device profile may include a set of characteristics of the client device 235b and the characteristics may include the display screen width, length, and resolution, among others. The message presentation formatter 213 may use the index fields that came with the messages as the display heading, group the messages according to a threading field, and fit the messages into a display screen of the client device, according to the characteristics included in the client device profile. A thread is a group of messages that have in common one or more fields that are significant or of interest to the reader of the messages. The common fields are called threading fields and the examples of the threading fields include a message subject, one or more key words in the message contents, a sender identity, a receiver identity, a time-date stamp, a keyword, an ad-hoc group designation, and a sender presence, among others. The threading field may be said to be associated with the messages. An ad-hoc group designation may be a name or character string which a user may associate with a message to create a group. An example ad-hoc group designation could be "comet watchers," "meteor observers," or other special interest designation or any arbitrary designation.

The message presentation formatter 213 may receive an input message from the client device, for example from the client device 235b, which may be a reply to a received message or a new, outgoing message. The message presentation formatter 213 may allow the user to send multiple copies of an outbound message if a recipient has multiple receiving devices, one copy per receiving device. The user may specify a format of the message and which device to send the message to using the UI 205b or have a default setting saved in a database such as the contact database 309. In addition, the message presentation formatter 213 may also allow the user to select a format for each copy of the message. Each copy of the outbound message may be in the generic message format, or a platform-specific message format, depending on the message platform supported by each of the receiving devices and a preferred message format that the recipient may have specified. For example, if the recipient has three receiving devices, a mobile phone for SMS message, a desktop for email, and a wireless PDA for IM, then the user may have a copy of the outbound message sent to the desktop in the generic message format, to the mobile phone in a native SMS format, and to the PDA in a specific IM format. Each copy of the outbound message is first sent from the message presentation formatter 213 to the message format translator 310 to be translated from the generic message format to a platform-specific message format, if there is a need, and to be saved in the message database 307.

The client device profile database 208 may contain a number of client device profile records, or entries. Each record in the client device profile database 208 may include one or more index fields that may include a client device identification (ID), a device type, and a device location, among others. A record of the client device profile database 208 may identify characteristics such as display screen width, height, number of colors, and resolution, memory, processor capability, and operating system on the client device, among others. The record may also identify the message platforms supported on the client device such as supported messaging and networking protocols, content representation languages, and supported services. The client device profile database 208 may be physically coupled with other components of the consolidated message network 201 or located remotely, as a system design choice. The other two databases that are associated with the message format translator 310, the message database 307 and the contact database 309, are described later.

FIG. 2 illustrates an embodiment 300 of the message format translator 310 coupled with the message database 307 and the contact database 309. The message format translator 310 comprises a message data manager 301, a message body processor 303, and a message header processor 305.

The message data manager 301 may receive an inbound, platform-specific message from a transport network or from a platform-specific message gateway, depending on the network configuration. The message data manager 301 may then send the platform-specific message to the message header processor 305 to process a message header of the platform-specific message and to build index fields from the message header. The message data manager 301 may also send the platform-specific message to the message body processor 303 to translate a message body of the platform-specific message. The message data manager 301 may use the message database 307 to store or retrieve a message in either a platform-specific or the generic message format for purposes such as helping build a reply message and saving a message history. The message data manager 301 may also use the contact database 309 to retrieve or store a contact information for a user.

The message data manager 301 may receive an outbound message in the generic message format from a client device such as the client device 235b in FIG. 1. The message data manager 301 may also send the outbound message in a platform-specific or the generic message format to a remote client device via the transport network. The format choice of the outbound message depends on whether the recipient client device supports the generic message format and on the message platform preferences of the receiver, if both the generic message format and platform-specific message formats are supported. The message data manager 301 may access the message database 307 to store or retrieve a message in either a platform-specific or the generic message format.

The message header processor 305 may receive a platform-specific inbound message from the message data manager 301. The message header may be in one of a variety of formats. The message header may be an email header, a chat message header, an IM header, a voice mail header or some other format of message header. The information contained in the message header may be from an input by the sender of the inbound message or generated by the network node from which the inbound message originates, depending on the message platform. For example, a subject title in an email message may be part of the header information that is input by the sender. An IP address of the originating network node in an IM message header may be generated by the network node. The message header processor 305 may take as input the message header and build one or more index fields from the header information. The index fields may be used for the message database operations such as creating a new message record, and searching for, or deleting an existing message record. The index fields may also be used for the UI presentation, for example by the UI 205b of FIG. 1. For example, the index fields may be used to create presentation columns, sort messages, or organize the messages by conversation or thread for presentation on a receiving client device such as the client device 235b of FIG. 1.

The message header processor 305 may receive an outbound message in the generic message format, for example from the client device 235b of FIG. 1. In this case, the message header processor 305 may create a message platform-specific header, and send the message platform-specific header to the message data manager 301 to be combined with a platform-specific message body of the outbound message. Some of the message header information may come from the input from the sender. For example, a subject title in an email message may be part of the input by the sender. Some of the message header information may be retrieved from the contact database 309. For example, the sender may have only provided an IM screen name of the recipient of the outbound message. The message header processor 305 may retrieve the email account name using the IM screen name from the contact database 309.

The message body processor 303 may receive a platform-specific inbound message from a transport network or a platform-specific message gateway. The message body processor 303 may take as input the message body and convert the platform-specific contents into message contents in a generic message format. In one embodiment, an XML-based format is adopted as the generic message format. Other markup language variants such as standard generalized markup language (SGML), hypertext markup language (HTML), and extensible HTML (XHTML), among others, may be used in other embodiments. In the present disclosure, translating the message body into an XML-based format may comprise parsing the contents of the message body, adding XML tags and headers to the parsed message body, formatting the message body into an XML-compliant format, and creating XML specific auxiliary files such as document type definition (DTD) files.

The message body processor 303 may receive an outbound message in the generic message format. In such a case, the message body processor 303 may translate the message body in the generic message format into a message in a platform-specific message format suitable to the receiving client device. The message body processor 303 may translate the XML message body into a platform-specific message format such as email, voice mail, IM and SMS, among others.

The message database 307 may store messages in both a platform-specific message format and the generic message format. It may support database operations such as query, modify, add, delete, and others. The message database 307 may be implemented as a single physical database or multiple ones, depending on the design choice. It may use object-oriented database, relational database, or other future database technologies. Although the message database 307 may be closely coupled with other components of the message format translator 310, the present disclosure may also allow a distributed configuration where the message database 307 or part of the message database 307 may be located remotely.

The contact database 309 contains a number of user contact records or entries. A contact record may comprise a contact name, a contact address, multiple contact identities for a user, and other information. The user may have multiple contact identities, for example one for each message platform. For example, the user may have an email name, an IM screen name, a separate IRC chat name, an SMS account ID, and a phone number. Each of these identities may be different from other identities. The contact database 309 allows for a mapping from one identity to one of the other identities. The contact database 309 may be physically coupled with other components of the message format translator 310 or located remotely, depending on the design choice.

Figure 3:
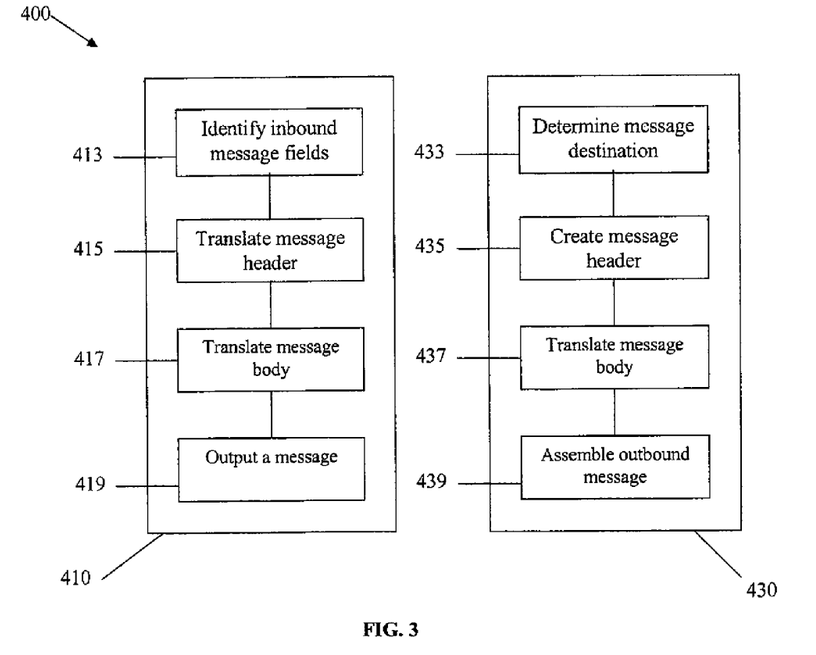
FIG. 3 illustrates an embodiment of a method for translating message formats.

FIG. 3 illustrates an embodiment of a method 400 of translating message formats. The method 400 comprises a sub-set 410 of translating the message formats for inbound messages and a sub-set 430 of translating the message formats for outbound messages. The sub-set 410 of translating the message formats for the inbound message comprises identifying components or fields of an inbound message at block 413, processing the message header at block 415, translating the message body at block 417, and outputting the message in a generic message format at block 419.

The block 413 shows identifying components or fields of an inbound message. The inbound message may be in a platform-specific message format, such as email, voice mail, IM, SMS message, and IRC message. This may include saving the inbound message in a message database such as the message database 307 of FIG. 2, and then extracting a message header and a message body from the inbound message. The message header and the message body may then be processed individually.

The block 415 shows processing the message header. This may include parsing the message header and creating index fields from the header information. Data items contained in the message header may vary, depending on the message type. Some example data items contained in the message header may include a from field, a to field, a subject field, a text body field, a time stamp field, an importance indicator field, a privacy field, a message size field, an attachment indicator field, and a message type field. The message type field indicates the original message platform of the inbound message, such as email, IM, SMS, and IRC, among others. Processing the message header may optionally create a new message header. One method of obtaining the new header is to create a union of the index fields of each of the platform-specific message types. The index fields may be used for presentation of the message at a client device such as a mobile phone. The index fields may also be used for database operations, for example, as the database index fields for the add, delete and modify operations.

The block 417 shows translating the message body which may include parsing the message body, converting the message body into a generic message format such as an XML-based format, and creating auxiliary files as needed. Parsing the message body may include breaking the message body into syntactical units and checking whether that the message body is syntactically correct. Converting the message body into the generic message format may include adding XML tags to the parsed text and creating XML headers. Creating auxiliary files may include creating XML auxiliary files such as DTD files, as needed.

The block 419 shows outputting the messages. This may include assembling a message in the generic format from the translated message body and the new message header, storing the message in the generic format into the message database 307 of FIG. 2, and sending the message to the message presentation formatter 213 of FIG. 1 to be formatted for presentation at a client device.

The sub-set 430 of translating the message formats for the outbound messages may comprise determining the destination of the outbound message at block 433, creating a message header at block 435, translating the message body at block 437, and assembling the outbound message at block 439.

The block 433 shows determining the destination of an outbound message. This may include determining the number of the receiving client devices, and thus the number of copies of the outbound message that need to be sent to the receiving client devices, and identifying the format in which each copy of the outbound message is sent. Determining the number of copies of the outbound message to be sent may involve either receiving an instruction from the client device or using a default parameter that specifies the number of copies of the message to be sent for a user. Receiving the user instruction involves reading an instruction from a designated field in the outbound message header. Using the user input may take precedence over using the default parameter, depending on the system design. Identifying the message format for each copy of the outbound message may involve determining the message format supported by the receiving client device and a preference expressed by the user. The example message formats may include email, voice mail, SMS message, IRC message, and IM message, among others.

The block 435 shows creating the message header. This may involve extracting the index fields from the outbound message, obtaining an identity of the receiving client device from the contact database 309 of FIG. 3, and assembling a platform-specific message header. Extracting the index fields may involve obtaining the index fields from the input message in the generic message format and from the original inbound message, if this outbound message is a reply to the inbound message. Obtaining the identity of the receiving device involves querying the contact database 309 of FIG. 3 for a new contact identity with a known contact identity. The known identity may have come with the inbound message, and the new identity may be needed for the outbound message, for example, if the outbound message is in a message format different from that of the inbound message. For example, if the inbound message is an email, then the identity of an email address may not be applicable to an IM message which may need an IM screen name. Querying the contact database 309 of FIG. 3 using the email address may yield an IM screen name of the same user if one of the receiving client devices prefers an IM for the outbound message. The step at block 435 then assembles the index fields and the new identity into a message header appropriate for the message platform suitable to the receiving client device. If the outbound message header to be created is in the generic message format or the same platform-specific message format as the inbound message, then creating the message header becomes simpler, without the need to get the new contact identity from the known contact identity.

The block 437 shows translating the message body. This may involve converting the message body in the generic message format into a message in a platform-specific message format suitable to the recipient device. In one embodiment, an XML-based message format is adopted as the generic message format. In such an embodiment, converting the message body from the XML format into a platform-specific message format may comprise parsing the contents of the message body in the XML-based format with help from auxiliary files such as DTD files as needed, stripping XML tags and headers, and formatting the message into the platform-specific message format, among others. If the message format of the receiving client device is the generic message format, then translating the outbound message body may not be necessary.

The block 439 shows assembling the outbound message. This involves assembling the created message header and translated message body into a new message in a platform-specific message format and repeating the assembling process for each of the receiving client devices, if there are more than one receiving client devices were to receive the outbound message.

Figure 4:
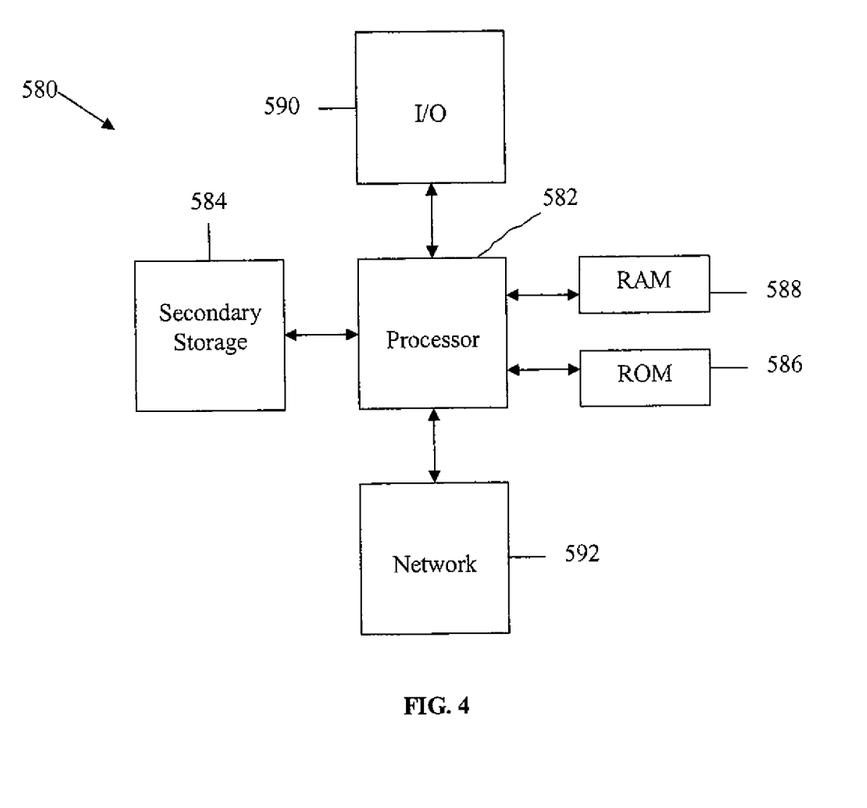
FIG. 4 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for consolidating platform-specific messages, comprising:

translating a first message in a first of a plurality of platform-specific message formats into a second message in a generic message format;

translating a third message in a second of the plurality of platform-specific message formats into a fourth message in the generic message format, wherein the plurality of platform-specific message formats comprise email, short message service, voice mail, and instant messaging, and wherein the first of the plurality of platform-specific message formats is different from the second of the plurality of platform-specific message formats;

associating the second and the fourth messages that have each been translated from one of the first of the plurality of platform-specific message formats and the second of the plurality of platform-specific message formats into the generic message format into at least one message thread based on at least one of a plurality of threading fields for presentation, wherein the at least one message thread is associated by a user with the second message and the fourth message;

inserting at least one of the first, second, third, and fourth messages into a message database;

managing the message database;

sending the at least one message thread from a first device to a second device; and mapping a first identity of a user for the first of the plurality of platform-specific message formats to a second identity of the user for the second of the plurality of platform-specific message formats, wherein the mapping is based on analysis of contact information in a contact database.

2. The method of claim 1, further comprising associating a generic user identity with the first identity of the user and the second identity of the user, wherein the threading field is based on the generic user identity.

3. The method of claim 1, wherein the threading field is based on at least one of an identity of a message sender associated with the messages, an identity of a message receiver associated with the messages, a time-date stamp associated with the messages, an ad-hoc group designation associated with the messages, and a keyword associated with the messages.

4. The method of claim 1, wherein the generic message format is an extensible markup language based format.

5. The method of claim 1, wherein the client device is at least one selected from the group consisting of: a wireless personal digital assistant; a mobile phone; and a wireless computing device.

6. The method of claim 5, further including:

displaying messages associated with a first thread on the client device;

selecting a second thread based on one of the messages contained in the first thread; and displaying messages associated with the second thread on the client device.

7. The method of claim 1, further comprising:

translating a fifth message in the generic message format into a sixth message in one of the plurality of platform-specific message formats.

8. The method of claim 1, further comprising:

receiving a fifth message in the generic format; and retaining the fifth message in the generic format based on a device profile of a second client device to which the fifth message is to be delivered.

9. A method for consolidating messages of different message platforms, comprising:

receiving a first message in a first of a plurality of platform-specific message formats, wherein the plurality of platform-specific message formats comprise email, short message service, voice mail, and instant messaging;

creating a new message header from a message header of the first message, wherein the creating further comprises creating a union of at least some of a plurality of index fields in the message header of the first message;

translating a message body of the first message into a new message body by parsing the message body of the first message, wherein the parsing further comprises breaking the message body of the first message into syntactical units;

creating a second message in a generic message format from the new message header and the new message body;

receiving a third message in a second of the plurality of platform-specific message formats, wherein the first of the plurality of platform-specific message formats is different from the second of the plurality of platform-specific message formats;

translating the third message in the second of the plurality of platform-specific message formats into a fourth message in the generic message format;

threading the second and the fourth messages that have each been translated from one of the first of the plurality of platform-specific message formats and the second of the plurality of platform-specific message formats into the generic message format into at least one message thread based on at least one of a plurality of threading fields for presentation, wherein the at least one message thread is associated by a user with the second message and the fourth message;

sending the at least one message thread from a first device to a second device; and mapping a first identity of a user for the first of the plurality of platform-specific message formats to a second identity of the user for the second of the plurality of platform-specific message formats, wherein the mapping is based on analysis of contact information in a contact database.

10. The method of claim 9, further comprising:
receiving a fifth message in the generic message format;
translating the fifth message into a sixth message in a third one of the pluralities of platform-specific message formats;
retrieving a first receiving client device profile and a second receiving client device profile from a contact database; and
sending the sixth message to the first receiving client device.

11. The method of claim 10, further comprising:
translating the fifth message into a seventh message in a fourth one of the pluralities of platform-specific message formats, wherein the third of the plurality of platform-specific message formats is different from the fourth of the plurality of platform-specific message formats; and
sending the seventh message to the second receiving client device.

12. The method of claim 10, further comprising:
retrieving an outgoing message format from the contact database;
translating the fifth message into the sixth message in the outgoing message format; and sending the sixth message to one or more of the first receiving client device and the second receiving client device.

13. The method of claim 9, wherein creating the new message header comprises putting the at least one message header in the generic message format.

14. The method of claim 9, wherein creating the union of at least some of the plurality of index fields comprises extracting at least some from a group consisting of: a sender name; a sender email address; a sender Internet protocol (IP) address; a receiver name; a receiver email address; a receiver IP address; a message format indicator; a time stamp; an attachment indicator; a privacy indicator; and an importance indicator.

15. The method of claim 9, wherein translating the message body of the first message adding a plurality of tags of the generic message format to the message body, and creating at least one auxiliary file for the generic message format.

16. A system for consolidating platform-specific messages, comprising:
a message format translator configured to translate a first message in a first of a plurality of platform-specific message formats into a second message in a generic message format, and to translate a third message in a second of the plurality of platform-specific message formats into a fourth message in the generic message format, wherein the plurality of platform-specific message formats comprise email, short message service, voice mail, and instant messaging, and wherein the first of the plurality of platform-specific message formats is different from the second of the plurality of platform-specific message formats;
a message presentation formatter configured to thread the second and the fourth messages in the generic message format that have each been translated from one of the first of the plurality of platform-specific message formats and the second of the plurality of platform-specific message formats into at least one thread based on at least one of a plurality of threading fields for presentation, wherein the at least one message thread is associated by a user with the second message and the fourth message, and wherein the at least one message thread is sent from a first device to a second device;
a message database configured to insert, search for, modify, and delete the first message, the second message, the third message, and the fourth message; and
a contact database configured to map a first identity of a user for a first platform-specific message format to a second identity of the user for a second platform-specific message format.

17. The system of claim 16, wherein the message presentation formatter is coupled with a client device profile database configured with a plurality of client device profiles comprising a client device identity, a display screen width, a display screen height, a display screen resolution, and a client device type.

18. The system of claim 16, wherein the message format translator and the message presentation formatter are combined into one device.

19. The system of claim 16, wherein the message format translator and the message presentation formatter are in two separate devices.

* * * * *